United States Patent [19]
Hattori

[11] Patent Number: 4,937,871
[45] Date of Patent: Jun. 26, 1990

[54] SPEECH RECOGNITION DEVICE

[75] Inventor: Hiroaki Hattori, Tokyo, Japan

[73] Assignee: NEC Corporation, Tokyo, Japan

[21] Appl. No.: 356,049

[22] Filed: May 24, 1989

[30] Foreign Application Priority Data
May 24, 1988 [JP] Japan .................. 63-127825

[51] Int. Cl.⁵ .............................. G10L 5/06
[52] U.S. Cl. ...................................... 381/43
[58] Field of Search .................. 381/41–47;
364/513.5

[56] References Cited
U.S. PATENT DOCUMENTS

| | | | |
|---|---|---|---|
| 4,624,010 | 11/1986 | Takebayashi | 381/43 |
| 4,625,287 | 11/1986 | Matsuura et al. | 381/43 |
| 4,783,807 | 11/1988 | Marley | 381/43 |
| 4,817,159 | 3/1989 | Hoshimi et al. | 381/43 |

Primary Examiner—Gary V. Harkcom
Assistant Examiner—John A. Merecki
Attorney, Agent, or Firm—Sughrue, Mion, Zinn, Macpeak & Seas

[57] ABSTRACT

A speech recognizing device capable of recognizing a speech uttered in a noisy environment. The device uses low frequency data which are hardly susceptible to spectrum fluctuations for those portions of an input speech which are similar to vowels, while using entire frequency data for the other portions of the speech.

4 Claims, 5 Drawing Sheets

SPEECH RECOGNITION DEVICE

BACKGROUND OF THE INVENTION

The present invention generally relates to an improvement in a speech recognizing device and, more particularly, to a speech recognizing device capable of accurately recognizing speech which is uttered in a noisy environment.

In a prior art speech recognizing device, word recognition is usually implemented by a DP matching principle as taught by Sakoe and Chiba in a paper entitled "Continuous Word Recognition Based on Time Normalization of Speech Using Dynamic Programming", the Institute of Acoustic Engineers of Japan, Transactions, 27, 9, pp. 483-500 (1971) (hereinafter referred to as reference 1). A problem heretofore pointed out with this kind of scheme is that the recognition accuracy of a noisy speech is lower than that of speech spoken in a quiet background. This ascribable to the fact that not only the speech in noisy environment is masked by additive noise but also the spectrum of the utterance itself is deformed. The deformation is in turn ascribable to the general tendency that one speaks louder and clearer in noisy environments because the speaker cannot hear his own utterance clearly. For example, the spectra of a certain vowel spoken in quiet and noisy environments by the same male speaker show that the utterance in noisy environment has not only greater overall energy but also has the contour of the spectrum, formant positions and bandwidth changed. In general, such a change is observed with all the vowels. In this manner, the spectrum noticeably differs from quiet background to noisy background even for the same vowel, resulting in a substantial distance between vowel patterns and therefore in recognition errors.

Some different approaches are available for recognizing speeches in noisy environments. For example, it is known that the recognition accuracy of a noisy speech increases as the environments at the time of recognition and that of registration become close to each other, as C. H. Lee and K. Ganesan teach in "Speech Recognition Under Additive Noise", ICASSP 1984, 35.7 (1987.3) (hereinafter referred to as reference 2). A method which may be derived from this finding is to register standard patterns uttered in a number of different environments beforehand (hereinafter referred to as method 1). It was reported that a method using a weighted Cepstrum distance as a distance measure (hereinafter referred to as method 2) is advantageous for the recognition of noisy speeches, by Umezaki and Itakura in "Comparison and Evaluation of the Distance Measures by Weighted FFT Cepstrum and Smoothed Group Delay Spectrum Coefficients", the Institute of Acoustic Engineers of Japan, Manuscript Collection, 1-5-11, Aug. 1987 (hereinafter referred to as reference 3). Further, the above-mentioned spectra suggest that the spectrum deformation is significant in the frequency range above 2.5 kilohertz but insignificant in the frequency range lower than the same. This tendency holds true with other vowels also. In the light of this, a speech may be recognized by using the characteristics of a spectrum of the frequency range lower than 2.5 kilohertz (hereinafter referred to as method 3).

However, method 1 cannot cope with the spectrum fluctuation of a speech in noisy environment without increasing the time and labor necessary for registration, the amount of storage, and the amount of processing to prohibitive degrees. Method 2 is advantageously applicable to additive white noise and the like because the weighted Cepstrum distance is given much weight in the formant peaks. However, method 2 is susceptible to the changes in the format positions and bandwidth and therefore cannot deal with the above-discussed spectrum fluctuation. Further, method 3 is apt to rather aggravate the recognition accuracy because it cannot readily identify fricatives, plosives and other consonants in distinction from each other.

SUMMARY OF THE INVENTION

It is therefore an object of the present invention to provide a speech recognizing device capable of recognizing noisy speeches without increasing the time and labor necessary for registration, the amount of storage, and the amount of processing.

It is another object of the present invention to provide a generally improved speech recognizing device.

A speech recognizing device of the present invention comprises an entire frequency analyzing section for producing entire frequency characteristic vectors representative of data associated with an entire frequency band of an input speech, a low frequency analyzing section for producing low frequency characteristic vectors representative of data associated with a low frequency band of the input speech, an entire frequency standard pattern storing section for storing entire frequency characteristic vectors of predetermined standard patterns, a low frequency standard pattern storing section for storing low frequency characteristic vectors of predetermined standard patterns, a weighting coefficient processing section for storing weighting coefficients, an entire frequency distance calculating section for calculating an entire frequency distance between the entire frequency characteristic vectors of the input speech and the entire frequency characteristic vectors of the standard pattern, a low frequency distance calculating section for calculating a low frequency distance between the low frequency characteristic vectors of the input speech and the low frequency characteristic vectors of the standard pattern, a frame distance calculating section for determining a frame-to-frame distance between an input pattern and the standard pattern by weighting the entire frequency distance and the low frequency distance by the weighting coefficients, and a recognizing section for recognizing the input speech by using the frame-to-frame distance.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

To better understand the present invention, a brief reference will be made to a prior art device for speech recognition.

Figure 1:
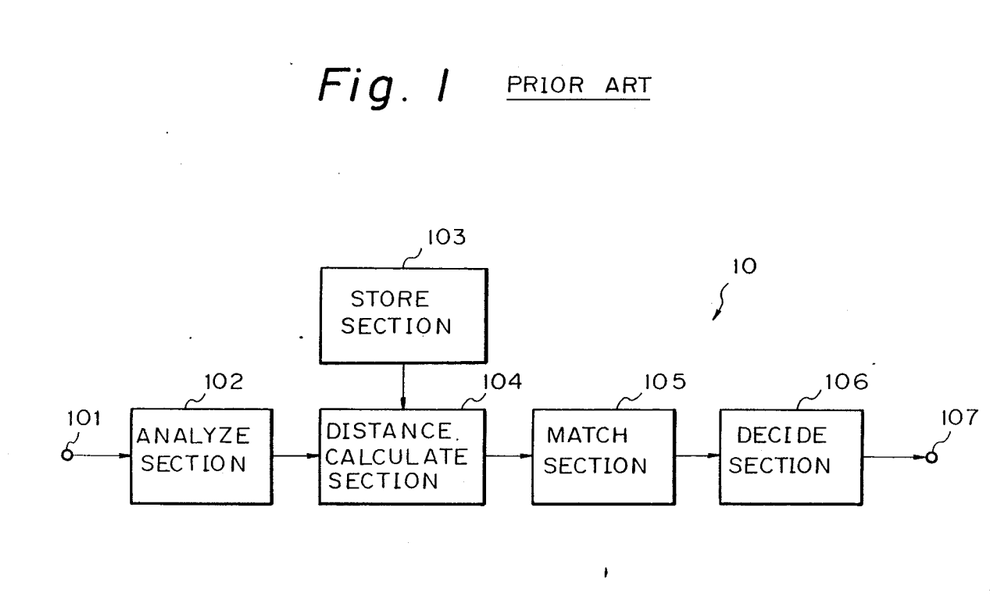
FIG. 1 is a schematic block diagram of a prior art speech recognition system.

Referring to FIG. 1 of the drawings, a word recognition system adopting the DP matching principle as disclosed in the previously mentioned reference 1 is shown and generally designated by the reference numeral 10. As shown, the system 10 has an input terminal 101 to which a speech is applied, an analyzing section 102, a storing section 103, a distance calculating section 104, a matching section 105, a deciding section 106, and an output terminal 107 for delivering the result of recognition. The analyzing section 102 analyzes an input speech to transform it into a characteristic vector time sequence. Let the characteristic vector time sequence be A and expressed as:

$$A = \{a(1), a(2), a(3), \ldots, a(i), \ldots, a(I)\}$$

where a (i) is representative of the characteristic vector of the "i-th" frame. The analysis for determining characteristic vectors may be implemented by a group of band-pass filters as taught by Furui in "Digital Speech Processing", Tokai University Publishing, FFT analysis, Cepstrum analysis, etc.

The storing section 103 stores standard patterns of M words which are registered beforehand. Assume that a word m, $1 \leq m \leq M$, has standard patterns of B(m) which are represented by:

$$B(m) = \{b(m,1), b(m,2), b(m,3), \ldots, b(m,j), \ldots, b(m,J_m)\}$$

The distance calculating section 104 determines, for each of the frames, the distance d(m,i,j) between the "i-th" frame a(i) of the input pattern and the "j-th" frame b(m,j) of the reference pattern. The frame distance d(m,i,j) may be defined as the Euclid distance:

$$d(m,i,j) = ||a(i) - b(m,j)|| \quad \text{Eq. (1)}$$

As the frame distance d(m,i,j) is fed from the distance calculating section 104 to the matching section 105, the matching section 105 matches the input pattern and the standard pattern such that g(m,k,j) which serves as an evaluation function becomes minimum, according to the following step-by-step equation:

$$g(m, i, j) = d(m, i, j) + \min \begin{array}{l} g(m, i-1, j) \\ g(m, i-1, j-1) \\ g(m, i-1, j-2) \end{array} \quad \text{Eq. (2)}$$

Assuming that the distances for all the standard patterns B(m) are dist(m), the matching section 105 performs an operation:

$$\text{dist}(m) = g(m, I, J_m) \quad 1 \leq m \leq M$$

Receiving the distances dist(m) from the matching section 105, the deciding section 106 feeds to the output terminal 107 the m which produces the minimum value, in the form of a result of recognition.

A problem with the prior art system 10 is that a speech in noisy environment is lower in recognition accuracy than a speech in less noisy environment, as discussed earlier. The difficulty experienced in recognizing a speech uttered in noisy background stems not only from the fact that the speech is masked by additive noise but also from the fact that the spectrum of utterance itself is deformed, as also discussed previously. The deformation of spectrum is in turn ascribable to the general tendency that one tends to speak louder and clearer in noisy environments because the speaker's own utterance itself is hard to hear.

Figure 2:
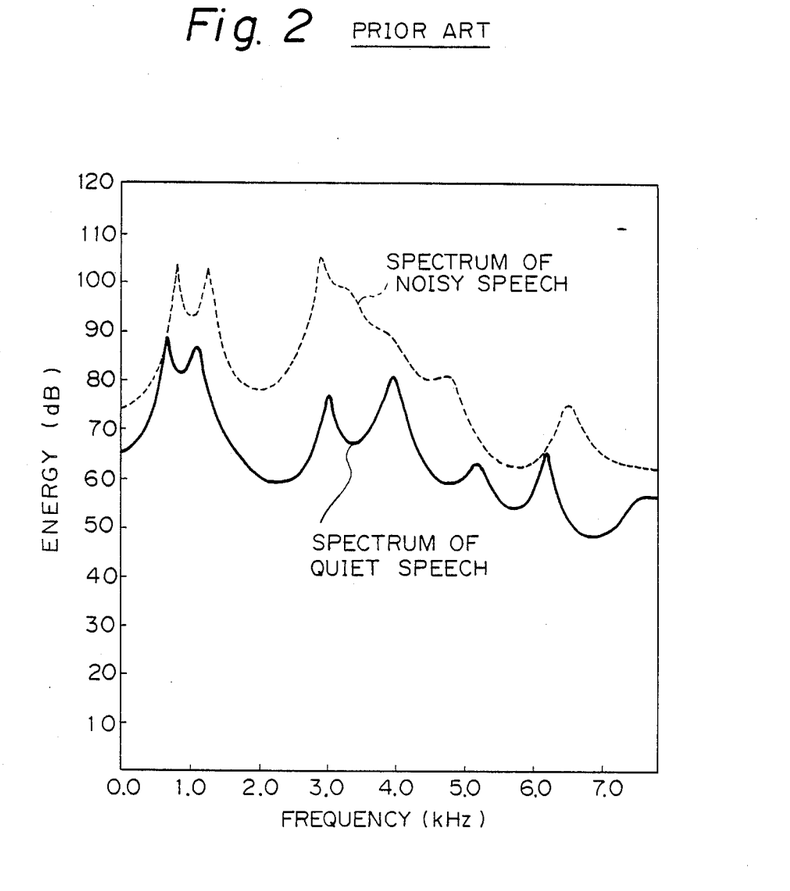
FIG. 2 plots spectrum of the same vowel which is uttered in quiet and noisy environments.

FIG. 2 plots specific spectra of vowel /a/ which a single male speaker uttered in quiet and noisy environments. Specifically, a solid curve and a dotted curve in the figure are representative of the spectra of voice associated with quiet and noisy environments, respectively. As shown, in a noisy environment, not only the overall energy is increased but also the contour of the spectrum, formant positions and bandwidth are changed. Such a deformation are generally observed not only with vowel /a/ but also with the other vowels. In this manner, the spectrum of a vowel noticeably varies from one background noise level to another background noise level, resulting in an increase in the distance between vowel patterns and therefore in recognition errors.

The present invention enhances accurate speech recognition by using low frequency data which involves a minimum of spectrum fluctuation for those portions of a speech which seem to be vowels, while using the entire frequency band data for the other portions of the speech. A device for speech recognition in accordance with the present invention will be described in detail hereinafter.

Assuming that the entire frequency characteristic vector time sequence is $A_{all}$, the entire frequency data of an input speech may be expressed as:

$$A_{all} = \{a_{all}(1), a_{all}(2), \ldots, a_{all}(i), \ldots a_{all}(I)\}$$

The entire frequency characteristic vectors are obtainable by using the analysis relying on a filter band as shown and described in reference 4, FFT analysis, Cepstrum analysis, etc. Assuming that the low frequency characteristic vector time sequence is $A_{low}$, it may be expressed as:

$$A_{low} = \{a(_{low}(1), a_{low}(2), \ldots, a(i), \ldots, a_{low}(I)\}$$

To determine low frequency characteristic vectors, there is available an analysis of the type using frequencies lower than 2.5 kilohertz which contain the first and second formants.

The entire frequency characteristic vector time sequence $B_{all}$ of the standard patterns which are assigned to a word m is produced by:

$$B_{all}(m) = \{b_{all}(m,1), b_{all}(m,2), \ldots, b_{all}(m,j), \ldots, b_{all}(m,J_m)\}$$

On the other hand, the low frequency characteristic vector time sequence $B_{low}(m)$ is represented by:

$$B_{low}(m) = \{b_{low}(m,1), b_{low}(m,2), \ldots, b_{low}(m,j), \ldots, b_{low}(m,J_m)\}$$

Assuming a predetermined weighting coefficient of W(m), $$W(m) = \{w(m,1), w(m,2), \ldots, w(m,j), \ldots, w(m,J_m)\}$$

Let it be assumed that w(m,j) has a value close to 1 (one) if the "j-th" frame of the standard pattern of the word m seems to be a vowel and a value close to 0 (zero) if otherwise.

Next, the entire frequency distance $d_{all}(m,i,j)$ and the low frequency characteristic vector distance $d_{low}(m,i,j)$ are determined with respect to the "i-th" frame of the input pattern and the "j-th" frame of the standard pattern of the word m. The distances $d_{all}(m,i,j)$ and $d_{low}(m,i,j)$ are obtainable by using the Euclid distance as represented by the Eq. (1), for example. The frame distance d(m,i,j) may be produced by weighting $d_{all}(m,i,j)$ and $d_{low}(m,i,j)$ by w(m,j), e.g.:

$$d(m,i,j) = (1-w(m,j)) \times d_{all}(m,i,j) + w(m,j) \times d_{low}(m,i,j) \qquad \text{Eq. (3)}$$

The input speech is recongnized by using the resulting frame distance in combination with, for example, the DP matching procedure which is described in reference 1. The DP matching may of course be replaced with linear matching or similar matching approach which uses a vector distance.

With the illustrative speech recognizing device, it is not necessary to store the weighting coefficient w(m,j), i.e., a weighting coefficient may be obtained from an input speech. While this alternative approach may need a greater amount of processing for speech recognition, it successfully copes with the appearance of voiceless vowels and the omission of vowels of an input speech.

Specifically, the alternative approach begins with a step of determining a vowel characteristic amount α of a speech which is representative of the degree of similarity to a vowel, as follows:

$$\alpha = \{\alpha(1), \alpha(2), \ldots, \alpha(i), \ldots, \alpha(I)\} \qquad \text{Eq. (4)}$$

Some different methods are available for determining the vowel characteristic amount α. First, the amount α may be produced in the form of α(i)=frequency band energy containing the first formant of the "i-th" frame. Second, the amount α may be represented by a ratio between the entire frequency energy $E_{all}(i)$ and the low frequency energy $E_{low}(i)$ of the "i-th" frame, as follows:

$$\alpha(i) = E_{low}(i)/E_{high}(i) \qquad \text{Eq. (5)}$$

A third method relies on pitch extraction, as follows:

$$\alpha(i) = \begin{cases} 1, 0: \text{when pitch is detected in the "i-th" frame} \\ 0: \text{when pitch is not detected in the "i-th" frame} \end{cases} \qquad \text{Eq. (6)}$$

The pitch extraction mentioned above may be implemented by an autocorrelation function as described in reference 4, for example.

Based on the vowel characteristic amount, a weighting coefficient W is calculated as follows:

$$W = \{w(1), w(2), \ldots, w(i), \ldots, w(I)\}$$

For example, w(i) is produced by:

$$w(i) = \begin{cases} \dfrac{\alpha(i) - th}{\alpha_{max} - th} & (\alpha(i) - th \geq 0) \\ 0 & (\alpha(i) - th < 0) \end{cases} \qquad \text{Eq. (7)}$$

where $\alpha_{max}$ is the maximum value of α(i), and th is a predetermined threshold value. The frame distance d(m,i,j) is produced by weighting $d_{all}(m,i,j)$ and $d_{low}(m,i,j)$ by w(i), e.g.:

$$d(m,i,j) = (1-w(i)) \times d_{all}(m,i,j) + w(i) \times d_{low}(m,i,j) \qquad \text{Eq. (8)}$$

The approach which obtains a weighting coefficient from an input speech only as stated above may be replaced with an approach which calculates it by using the vowel characteristic amount of a standard input speech and that of a standard pattern, as will be described. This alternative approach is successful not only in dealing with the appearance of voiceless vowels and disappearance of vowels but also in achieving more adequate weighting due to the use of an input pattern and a standard pattern, although it may increase the amount of processing for speech recognition and the amount of standard patterns stored.

Any of the methods represented by the Eqs. (4), (5) and (6) may be used to determine the vowel characteristic amount of a speech from an input speech. Assuming that the vowel characteristic amount of a predetermined standard pattern associated with the word m is β(m) and expressed as:

$$\beta(m) = \{\beta(m,1), \beta(m,2), \ldots, \beta(m,j), \ldots, \beta(m,Jm)\}$$

where $1 \leq m \leq M$.

By using the amount β(m) and the determined amount α(i) of the input speech, a weighting coefficient W(m) is calculated as:

$$W(m) = \{w(m,i,j)\}$$

where $1 \leq m \leq M$, $1 \leq i \leq I$, and $1 \leq j \leq Jm$.

W(m,i,j) may be produced, for example, by:

$$w(m, i, j) = \begin{cases} \dfrac{\alpha(i) - th}{\alpha_{max} - th} \times \dfrac{\beta(m,j) - th}{\beta_{max}(m) - th} \\ \qquad : \alpha(i) \geq th, \beta(m,j) \geq th \\ 0 \quad : \text{otherwise} \end{cases} \qquad \text{Eq. (9)}$$

where $\alpha_{max}$ is the maximum value of α(i), $\beta_{max}$ is the maximum value of β(m,j), $1 \leq j \leq Jm$, and th is a predetermined threshold value. The vector distance d(m,i,j) is produced by weighting $d_{all}(m,i,j)$ and $d_{low}(m,i,j)$ by w(m,i,j). For example, $$d(m,i,j) = (1-w(m,i,j)) \times d_{all}(m,i,j) + w(m,i,j) \times d_{low}(m,i,j) \qquad \text{Eq. (10)}$$

Concerning the method described above, when use is made of the Cepstrum analysis or similar approach in which a characteristic vector is produced by frequency analysis, the result of frequency analysis associated with the entire frequency characteristic vector is available for determining the low frequency characteristic vector and the vowel characteristic amount.

Preferred embodiments of the speech recognizing device in accordance with the present invention will be described hereinafter.

Figure 3:
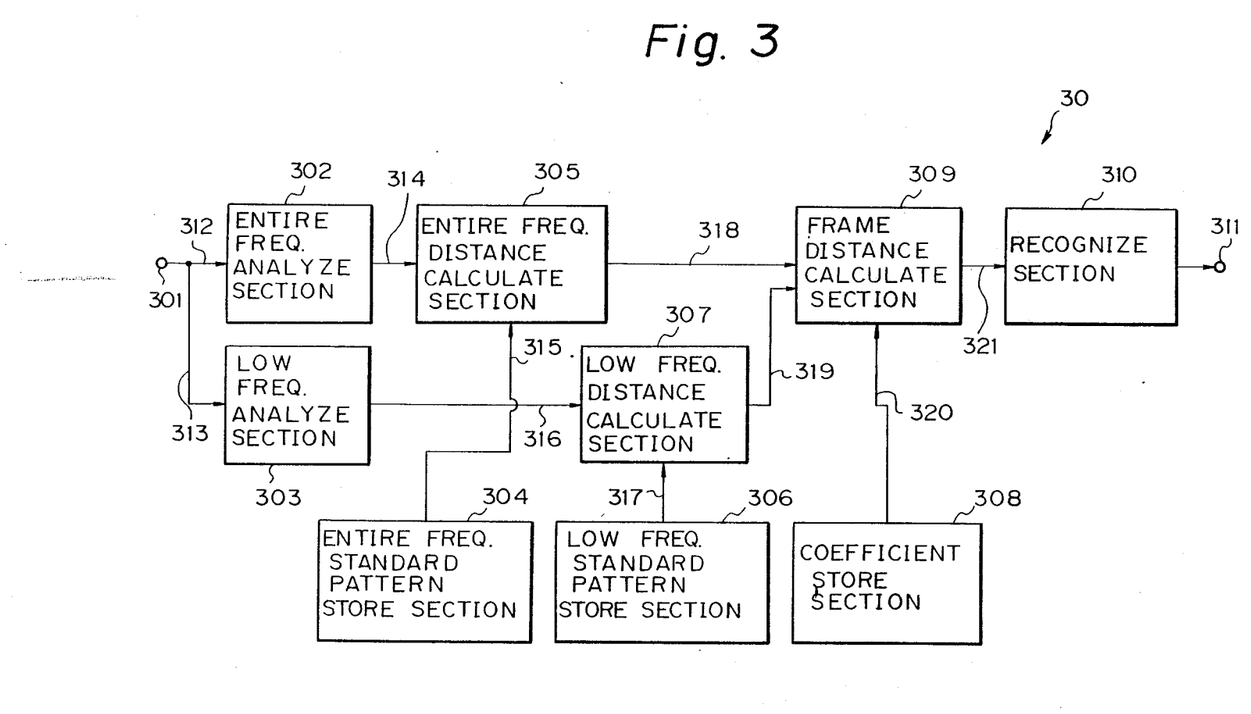
FIG. 3 is a schematic block diagram showing a speech recognizing device embodying the present invention.

Referring to FIG. 3, a speech recognizing device embodying the present invention is shown and generally designated by the reference numeral 30. As shown, the device 30 has an input terminal 301 to which speech is applied, an entire frequency analyzing section 302, a low frequency analyzing section 303, an entire frequency standard pattern storing section 304, an entire frequency distance calculating section 305, a low frequency standard pattern storing section 306, a low frequency distance calculating section 307, a calculating and storing section 308, a frame distance calculating section 309, a recognizing section 310, and an output terminal 311. The entire frequency analyzing section 302 receives over a signal line 312 an input speech which is applied to the input terminal 301. By using the entire frequency data, the analyzing section 302 determines Cepstrum coefficients to produce an entire frequency characteristic vector time sequence $A_{all}$. Receiving the input speech over a signal line 313, the low frequency analyzing section 303 determines Cepstrum coefficients on the basis of 2.5 kilohertz and lower frequency data to thereby produce a low-frequency characteristic vector time sequence $A_{low}$. The entire frequency standard pattern storing section 304 stores the entire frequency characteristic vectors $B_{all}(m)$ of M words, $1 \leq m \leq M$. The low frequency standard pattern storing section 306 stores low frequency characteristic vectors $B_{low}(m)$ of M words, $1 \leq m \leq M$. The coefficient storing section 308 stores weighting coefficients $W(m)$ of M words, $1 \leq m \leq M$. The entire frequency distance calculating section 305 receives the entire frequency characteristic vector time sequence $A_{all}$ of the input speech and the entire frequency characteristic vector time sequence $B_{all}(m)$ over signal lines 314 and 315, respectively, thereby calculating the entire frequency distance $d_{all}(m,i,j)$ by using the Eq. (1). On the other hand, the low frequency distance calculating section 307 receives the low frequency characteristic vector time sequence $A_{low}$ of the input speech and the low frequency characteristic vector time sequence $B_{low}(m)$ of the word m over signal lines 316 and 317, respectively, thereby calculating the low frequency distance $d_{low}(m,i,j)$ by using the Eq. (1). The frame distance calculating section 309 receives the entire frequency distance $d_{all}(m,i,j)$, the low frequency distance $d_{low}(m,i,j)$ and the weighting coefficient $\alpha(m)$ over signal lines 318, 319 and 320, respectively, thereby calculating a frame distance $d(m,i,j)$ between the "i-th" frame of the input pattern and the "j-th" frame of the standard pattern by using the Eq. (3). Receiving the frame distance $d(m,i,j)$ over a signal line 321, the recognizing section 310 performs DP matching and feeds the result to the output terminal 311. The recognition technology adopting DP matching is shown and described in reference 1.

Figure 4:
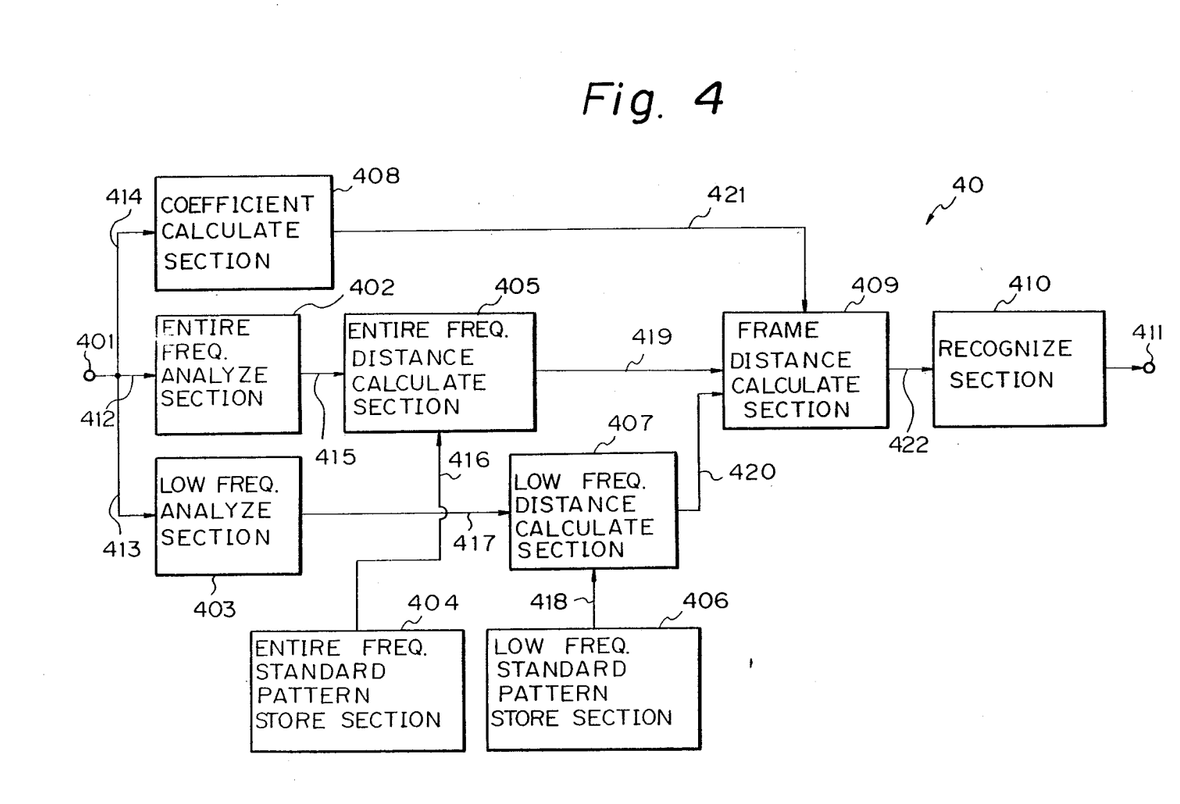
FIGS. 4 and 5 are schematic block diagrams each showing a different alternative embodiment of the present invention.

Referring to FIG. 4, an alternative embodiment of the present invention is shown. As shown, the device, generally 40, has an input terminal to which a speech is applied, an entire frequency analyzing section 402, a low frequency analyzing section 403, an entire frequency standard pattern storing section 404, an entire frequency distance calculating section 405, a low frequency standard pattern storing section 406, a low frequency distance calculating section 407, a coefficient calculating section 408, a frame distance calculating section 409, a recognizing section 410, and an output terminal. The entire frequency analyzing section 402 receives speech applied to the input terminal 401 over a signal line 412 and, by using the entire frequency data, determines Cepstrum coefficients to thereby produce an entire frequency characteristic vector time sequence $A_{all}$. On the other hand, the low frequency analyzing section 403 receives the input speech over a signal line 413 and, by using 2.5 kilohertz and lower frequency data, determines Cepstrum coefficients and feeds them in the form of a low frequency characteristic vector time sequence $A_{low}$. The entire frequency standard pattern storing section 404 stores the entire frequency characteristic vectors $B_{all}$ of M words, $1 \leq m \leq M$. The low frequency standard pattern storing section 406 stores the low frequency characteristic vectors $B_{low}(m)$ of M words, $1 \leq m \leq M$. Receiving the input speech over a signal line 414, the coefficient calculating section 408 determines the vowel characteristic amount $\alpha$ of the speech by using the Eq. (4) and then calculates a weighting coefficient $\alpha$ by using the amount $\alpha$ and Eq. (7). The entire frequency distance calculating section 405 receives the entire frequency characteristic vector time sequence $A_{all}$ and the entire frequency characteristic vector time sequence $B_{all}(m)$ of the word m over signal lines 415 and 416, respectively. In response, this calculating section 405 calculates a low frequency distance $d_{low}(m,i,j)$ by using the Eq. (1). The frame distance calculating section 409 receives the entire frequency distance $d_{all}(m,i,j)$, low frequency distance $d_{low}(m,i,j)$ and weighting coefficient W over signal lines 419, 420 and 421, respectively, thereby producing a frame distance $d(m,i,j)$ between the "i-th" frame of the input pattern and the "j-th" frame of standard pattern by using the Eq. (8). The recognizing section 410 receives the frame distance $d(m,i,j)$ over a signal line 422, then executes CP matching, and then delivers the result of recognition via the output terminal 411. Again, the recognition procedure using DP matching is discussed in reference 1.

Figure 5:
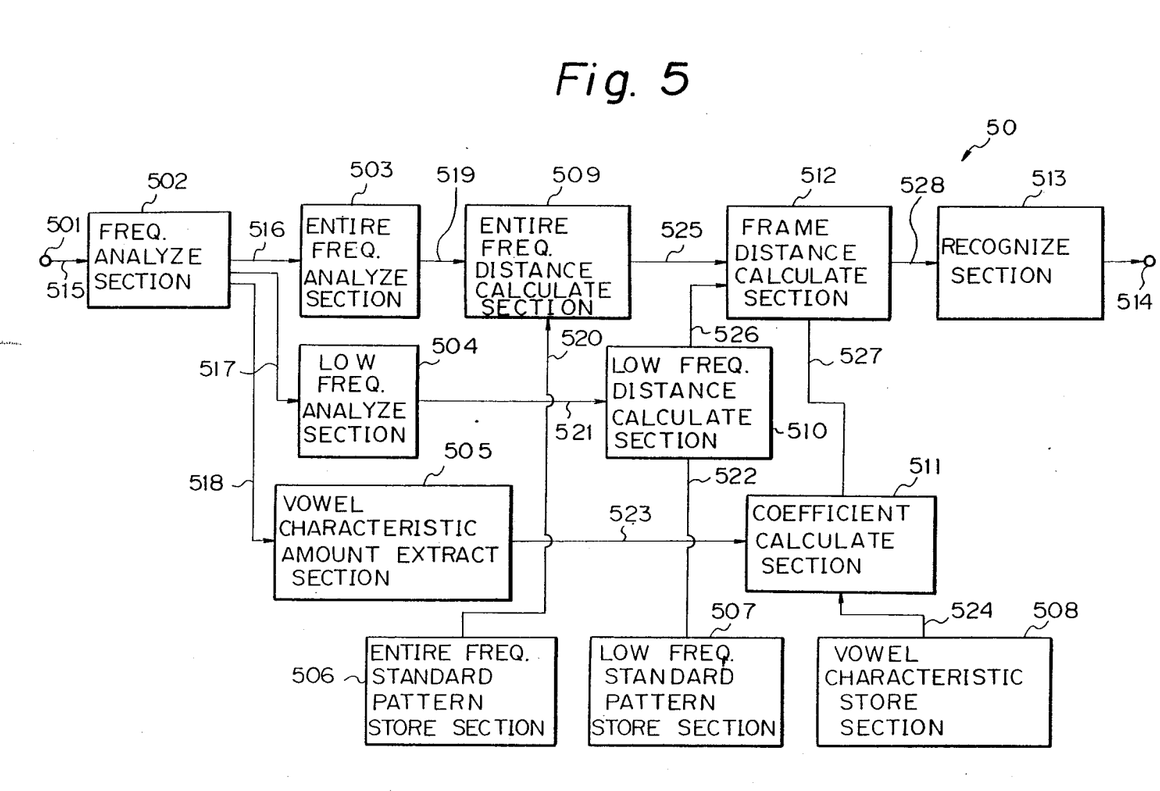

FIG. 5 indicates another alternative embodiment of the present invention. In the figure, the speech recognizing device, generally 50, has an input terminal 501 to which an input speech is applied, a frequency analyzing section 502, an entire frequency analyzing section 503, a low frequency analyzing section 504, a vowel characteristic amount extracting section 505, an entire frequency standard pattern storing section 506, a low frequency band standard pattern storing section 507, a vowel characteristic amount storing section 508, and entire frequency distance calculating section 509, a low frequency distance calculating section 510, a coefficient calculating section 511, a frame distance calculating section 512, a recognizing section 513, and an output terminal 514. The frequency analyzing section 502 receives the input speech via the input terminal 501 and over a signal line 515, then executes FFT analysis, and then produces a logarithm spectrum. The entire frequency analyzing section 503 receives the entire frequency logarithm spectrum over a signal line 516 and then produces Cepstrum coefficients to deliver them as an entire frequency characteristic vector time sequence $A_{all}$. The low frequency analyzing section 504 receives the logarithm spectrum of 2.5 kilohertz and lower frequencies over a signal line 517, thereby outputting a low frequency characteristic vector time sequence $A_{low}$. The vowel characteristic extracting section 505 receives the logarithm spectrum of a frequencey band of 200 hertz to 800 hertz which contains the first formant over a signal line 518, then determines the energy, and then calculates the vowel characteristic amount $\alpha$ by using the Eq. (4). The entire frequency standard pattern storing section 506 stores the entire frequency characteristic vectors $B_{all}(m)$ of M words, $1 \leq m \leq M$. The low frequency standard pattern storing section 507 stores the low frequency characteristic vectors $B_{low}(m)$ of M words, $1 \leq m \leq M$. The vowel characteristic amount storing section 508 stores the vowel characteristic amounts $\beta(m)$ of M words, $1 \leq m \leq M$. The entire frequency distance calculating section 509 receives the entire frequency characteristic vector time sequence $A_{all}$ of the input speech and the entire frequency characteristic vector time sequence $B_{all}(m)$ of a word m over signal lines 519 and 520, respectively, thereby calculating an entire frequency distance $d_{all}(m,i,j)$ by using the Eq. (1). The low frequency calculating section 510 receives the low frequency characteristic vector time sequence $A_{low}$ and the low frequency characteristic vector time sequence $B_{low}(m)$ of a word m over signal lines 521 and 522, respectively, and calculates a low frequency distance $d_{low}(m,i,j)$ by using the Eq. (1). The coefficient calculating section 511 receives the vowel characteristic amount $\alpha$ of the input speech and the vowel characteristic amount $\beta(m)$ of the word m over signal lines 523 and 524, respectively, so as to calculate a weighting coefficient $W(m)$ by using the Eq. (9). The frame distance calculating section 512 receives the entire frequency similarity $d_{all}(m,i,j)$, low frequency distance $d_{low}(m,i,j)$ and weighting coefficient $W(m)$ over signal lines 525, 526 and 527, respectively, thereby determining a distance $d(m,i,j)$ between the "i-th" frame of the input pattern and the "j-th" frame of the standard pattern by using the Eq. (10). Further, the recognizing section 513 receives the frame distance $d(m,i,j)$ over a signal line 528, executes DP matching, and applies the result of recognition to the output terminal 514. For the DP matching principle, a reference may be made to the reference 1, as previously mentioned.

In summary, it will be seen that the present invention provides a speech recognizing device capable of recognizing even speech uttered in a noisy environment with unprecedented accuracy.

Various modifications will become possible for those skilled in the art after receiving the teachings of the present disclosure without departing from the scope thereof.

What is claimed is:

1. A speech recognizing device comprising:
    entire frequency analyzing means for producing an entire frequency input pattern which is a sequence of entire frequency characteristic vectors representative of data associated with an entire frequency band of an input speech;
    low frequency analyzing means for producing a low frequency input pattern which is a sequence of low frequency characteristic vectors representative of data associated with a low frequency band of the input speech;
    entire frequency standard pattern storing means for storing entire frequency standard patterns which are sequences of entire frequency characteristic vectors of predetermined standard speech;
    low frequency standard pattern storing means for storing low frequency standard patterns which are sequences of low frequency characteristic vectors of predetermined standard speech;
    weighting coefficient processing means for storing predetermined weighting coefficients;
    entire frequency distance calculating means for calculating an entire frequency distance between the entire frequency characteristic vectors of the entire frequency input pattern and the entire frequency characteristic vectors of the entire frequency standard pattern;
    low frequency distance calculating means for calculating a low frequency distance between the low frequency characteristic vectors of the low frequency input pattern and the low frequency characteristic vectors of the low frequency standard pattern;
    frame distance calculating means for determining a weighted distance by calculating a weighted summation of the entire frequency distance and the low frequency distance using the weighting coefficients; and
    recognizing means for recognizing the input speech by using the weighted distance.

2. A device as claimed in claim 1, wherein said weighting coefficient processing means comprises weighting coefficient storing means loaded with predetermined weighting coefficients which are associated with the standard speech.

3. A device as claimed in claim 2, wherein said weighting coefficient processing means comprises coefficient calculating means which calculates weighting coefficients on the basis of the input speech.

4. A device as claimed in claim 1, wherein said weighting coefficient processing means comprises a vowel characteristic extracting means for producing from the input speech a vowel characteristic amount which is representative of a degree of similarity to a vowel, vowel characteristic amount storing means for storing predetermined vowel characteristic amounts associated with the standard speech, and weighting coefficient calculating means for calculating the weighting coefficients from the vowel characteristic amount of the input speech and the vowel characteristic amount of the standard speech.

* * * * *